United States Patent [19]
Feng et al.

[11] Patent Number: 6,077,892
[45] Date of Patent: Jun. 20, 2000

[54] CURABLE POLYOLEFIN COMPOSITIONS CONTAINING ORGANOSILICON COMPOUNDS AS ADHESION ADDITIVES

[75] Inventors: Qian Jane Feng, Midland; Kenneth Michael Lee, Bay City; Michael Andrew Lutz, Hope; Michael James Owen, Midland; Susan Victoria Perz, Essexville; Toshio Suzuki, Midland, all of Mich.

[73] Assignee: Dow Corning Corporation, Midland, Mich.

[21] Appl. No.: 09/148,805

[22] Filed: Sep. 4, 1998

[51] Int. Cl.$^7$ ...................................................... C08K 5/15
[52] U.S. Cl. ............................................................. 524/114
[58] Field of Search ..................................... 524/262, 114

[56] References Cited

U.S. PATENT DOCUMENTS

| | | | |
|---|---|---|---|
| 4,082,726 | 4/1978 | Mine | 260/46.5 |
| 4,087,585 | 5/1978 | Schulz | 428/429 |
| 4,684,538 | 8/1987 | Klemarczyk | 427/54.1 |
| 4,721,764 | 1/1988 | Fujiki | 528/15 |
| 4,732,932 | 3/1988 | Waldern | 524/862 |
| 4,906,686 | 3/1990 | Suzuki | 524/730 |
| 4,912,188 | 3/1990 | Colas | 528/15 |
| 4,975,488 | 12/1990 | Furukawa | 525/100 |
| 4,981,728 | 1/1991 | Homma | 427/386 |
| 5,232,959 | 8/1993 | Togashi | 523/211 |
| 5,397,648 | 3/1995 | Babu | 428/523 |
| 5,595,826 | 1/1997 | Gray | 428/450 |
| 5,683,527 | 11/1997 | Angell | 156/78 |
| 5,854,356 | 12/1998 | Bergstrom | 525/326.5 |

FOREIGN PATENT DOCUMENTS

| | | |
|---|---|---|
| 9316293 | 4/1993 | Japan . |
| 6-279691 | 1/1996 | Japan . |
| 06116368 | 9/1996 | Japan . |
| WO9621633 | 5/1996 | WIPO . |

*Primary Examiner*—Paul R. Michl
*Attorney, Agent, or Firm*—Alex Weitz

[57] ABSTRACT

The adhesion of cured polyolefin compositions to a variety of substrates is improved using as the adhesion promoter the combination of 1) an organic or organosilicon compound containing at least one epoxy group and 2) at least one compound containing a) at least one silanol or carbinol group or a hydrolyzable silanol group precursor, and b) at least one group that reacts during curing of the polyolefin.

21 Claims, No Drawings

CURABLE POLYOLEFIN COMPOSITIONS CONTAINING ORGANOSILICON COMPOUNDS AS ADHESION ADDITIVES

FIELD OF THE INVENTION

This invention relates to curable polyolefin compositions that contain a specified group of adhesion promoting additives to achieve strong bonding to a variety of substrates, particularly glass and metals.

BACKGROUND INFORMATION

The properties of polyolefin compositions are desirable for a variety of end use applications, particularly in construction, packaging, automotive and consumer markets. The compositions are useful as pressure sensitive adhesives for paper labels, for sealing tires and as adhesives for assembly of single ply roofing. Recently there is a trend toward the use of curable polyolefin compositions. One benefit of these curable compositions is the ability to prepare solventless compositions which following application and curing exhibit properties similar to those of solvent-based adhesives.

A shortcoming of polyolefin compositions, particularly those that cure by a platinum group metal catalyzed hydrosilation reaction, is their inability to develop strong adhesion to a variety of substrates, particularly glass and certain metals, following curing under commercially feasible conditions of time and temperature. One method for remedying this deficiency is by using primer compositions or adhesion promoting additives containing one or more silanes and/or organosiloxanes with a plurality of silicon-bonded hydrolyzable groups and at least one organofunctional substituent that is bonded to silicon through at least one carbon atom.

Primer compositions are applied to substrates to which adhesion is desired prior to application of a curable composition. Adhesion promoters are present as additional ingredients in curable composition.

U.S. Pat. No. 5,397,648 to Babu et al. describes pressure sensitive compositions for automotive masking tape. The compositions include a moisture curable alpha olefin copolymer containing hydrolyzable or condensable silyl groups.

U.S. Pat. No. 4,981,728 to Homma et al. describes a method for bonding curable organic polymer compositions to a surface using a primer. The curable composition contains 1) an organic polymer with SiX units where X is OH or hydrolyzable group, 2) an epoxy resin, 3) a curing agent for the epoxy resin and 4) a curing agent for the organic polymer. The primer is a vinyl polymer containing Si bonded to OH or hydrolyzable group and is a reaction product of a) a vinyl-containing polymer, preferably a poly(meth)acrylate, and b) a silane or siloxane containing hydrogen and hydrolyzable groups bonded to silicon.

The use of organic or inorganic compounds containing epoxy groups as adhesion promoters for curable organosiloxane compositions is taught in the following prior art:

Polyorganosiloxanes containing epoxy groups and silicon-bonded alkoxy groups at the terminal positions are described in U.S. Pat. No. 5,232,959 to Togashi et al.;

Polyorganosiloxanes containing alkenyl groups with at least 6 carbon atoms and at least one epoxy group are described in U.S. Pat. No. 4,912,188, which issued to Colas et al.;

The combination of an unsaturated alcohol and a polyorganosiloxane containing epoxy or acryloxy groups in combination with silicon-bonded alkoxy groups is described in U.S. Pat. No. 4,906,686 to Suzuki et al.;

Silanes containing silicon-bonded alkenyl or alkenyloxy groups in combination with an epoxy group are described in U.S. Pat. No. 4,732,932 to Waldem et al.;

The combination of a) a polyorganosiloxane containing SiOH and alkenyl groups and b) a silane containing epoxy and silicon-bonded alkoxy groups is described in U.S. Pat. No. 4,087,585 to Schulz; and U.S. Pat. No. 5,595,826, which issued to Gray and Lutz on Jan. 21, 1997 teaches using the combination of 1) a compound containing at least one epoxy group and 2) a compound containing at least one hydroxyl group and at least one substituent selected from silicon-bonded hydrogen, alkenyl, acryl and methacryl.

Japanese Laid Open Pat. Application 9-316293 published on Dec. 9, 1997 discloses curable compositions comprising 1) a hydrocarbon polymer containing in each molecule at least one ethylenically unsaturated group capable of participating in an hydrosilation reaction; 2) a curing agent containing at least two silicon-bonded hydrogen atoms per molecule; 3) a catalyst for promoting a hydrosilation reaction; 4) a compound referred to as a "silane coupling agent" and 5) an organoaluminum or organotitanium compound. The silane coupling agent is defined as a silane containing at least one alkoxy group and at least one organofunctional group selected from epoxy, methacrylyl, acrylyl, isocyanate, isocyanurate, vinyl and carbamate.

SUMMARY OF THE INVENTION

The present invention is based on the discovery that adhesion of cured polyolefin compositions to a variety of substrates is improved using as the adhesion promoter the combination of 1) an organic or organosilicon compound containing at least one epoxy group; and 2) at least one compound containing a) a silanol or carbinol group and b) a group that reacts with substituents on the polyolefin during curing of the polyolefin.

The use of this class of adhesion promoters for organosiloxane compositions is described in the aforementioned U.S. Pat. No. 5,595,826, however there is no teaching of the utility of these compositions for improving the adhesion of compositions containing at least one curable polyolefin in place of organopolysiloxanes described in the patent.

The adhesion-promoting additives of this invention can be used with polyolefin compositions that cure using any of the following reactions:

1) the platinum group metal-catalyzed reactions of silicon-bonded hydrogen atoms with alkenyl radicals present on the polyolefin;
2) the reaction of ethylenically unsaturated substituents on the polyolefin with mercapto groups in the presence of a catalyst that is typically a metal carboxylate of a chelated organometallic compound such as ferrocene;
3) reactions involving the ethylenically unsaturated substituents present on the polyolefin with either free radicals or cations formed by irradiation of photosensitive compounds with ultraviolet light and
4) reactions involving the ethylenically unsaturated substituents present on the polyolefin that are initiated by high energy particles such as those present in electron beams.

DETAILED DESCRIPTION OF THE INVENTION

This invention provides curable, self-adhering polyolefin compositions comprising A. a polyolefin wherein each molecule contains at least two ethylenically unsaturated substituents capable of reacting to cure said polyolefin; and B. an effective amount of an adhesion promoter for said polyolefin; wherein the adhesion promoter comprises
1) at least one compound B1 containing at least one epoxide group, wherein said compound B1 is selected from the group consisting of organic compounds and organosilicon compounds; and
2) at least one compound B2 containing a) at least one substituent selected from the group consisting of silanol (≡SiOH), hydrolyzable silanol precursors and carbinol (≡COH) and b) at least one substituent capable of reacting during curing of said polyolefin; and wherein all compounds corresponding to compound B1 constitute from 10 to 90 percent of the combined weight of all compounds corresponding to compounds B1 and B2.

As used in this specification the term "cure" means conversion of a liquid or semisolid composition to a crosslinked gel, elastomer or resinous material by the reaction of ethylenically unsaturated substituents present on the polyolefin referred to as ingredient A of the present compositions with a curing agent.

The preferred curing reaction for the polyolefin is 1) the reaction of the alkenyl radicals, such as allyl, present on the polyolefin with 2) an organohydrogensiloxane. The curable composition preferably includes a platinum group metal or a compound of one of these metals as a catalyst for this curing reaction.

The Adhesion-Promoting Additive (Ingredient B)

The characterizing feature of the present curable polyolefin compositions is the presence as an adhesion promoting additive of a mixture comprising 1) at least one organic or organosilicon compound containing at least one epoxide group, referred to herein as compound B1; and 2) at least one compound referred to herein as compound B2 and containing a) at least one silanol group, hydrolyzable silanol group precursor or carbinol group, and b) at least one substituent capable of participating in the reaction that occurs during curing of the polyolefin. Silicon-bonded alkoxy groups are examples of hydrolyzable silanol group precursors.

The total weight of all compounds corresponding to compound B1 constitutes from 10 to 90 percent, preferably from 33 to 80 percent, of the total weight of all compounds corresponding to compounds B1 and B2.

When compound B1 is an organic compound, it can contain from 3 to about 100 carbon atoms.

Examples of organic epoxide compounds suitable for use as compound B1 include but are not limited to aliphatic epoxides such as propylene oxide and butylene oxide; cycloaliphatic epoxides such as cyclohexene oxide; the mono- and diglycidyl ethers of mono- and polyhydric alcohols such as hexanol, ethylene glycol and trimethylolpropane; the glycidyl ethers of phenols and the mono- and diglycidyl ethers of bis-phenols. Oligomers of epoxide compounds containing unreacted epoxy groups can also be used.

Examples of organosilicon compounds containing epoxide groups include but are not limited to silanes containing at least one epoxy group per molecule and organopolysiloxanes containing epoxy groups as a part of terminal and/or non-terminal repeating units of the molecule.

In addition to the epoxy group(s) the silanes useful as compound B1 contain at least one hydrolyzable group per molecule. Example of hydrolyzable groups include but are not limited to alkoxy and acyloxy containing from 1 to 10 or more carbon atoms, isoalkenyloxy, ketoximo, and aminoxy. The only limitation on these hydrolyzable groups is that they do not interfere with curing of the polyolefin.

Preferred hydrolyzable groups are methoxy, ethoxy, isopropenoxy, and acetoxy.

Compound B1 can optionally contain at least one functional group capable of reacting during curing of the curable polyolefin referred to hereinafter as ingredient A of the present curable compositions.

To facilitate blending with the other ingredients of the present curable compositions the melting point of compound B1 is preferably below about 70° C.

Preferred embodiments of compound B1 include but are not limited to 3-glycidoxypropyltrimethoxysilane, 3-glycidoxypropyltriethoxysilane, monomeric and oligomeric glycidyl ethers of bis-phenols such as bisphenol A and other organic epoxides such as propylene oxide and cyclohexene oxide. Other preferred embodiments of compound B1 are described in U.S. Pat. Nos. 4,082,726 and 4,087,585; and 5,595,826, all of which are incorporated herein by reference.

The second required ingredient of the adhesion-promoting additives of this invention, referred to herein as compound B2, contains 1) at least one hydroxyl group, silanol group, or hydrolyzable silanol precursor and 2) at least one group capable of participating in the reaction used to cure the polyolefin into which the present adhesion promoters are incorporated. In preferred curable polyolefin compositions, this group contains ethylenic unsaturation.

When compound B2 is an alcohol it is preferably represented by the formula $R^1(OH)_m$. $R^1$ in this formula is an ethylenically unsaturated hydrocarbon radical exhibiting a valence of m and containing at least 3 carbon atoms and m is an integer with a value of at least 1. The value of m is preferably from 1 to 3.

The hydrocarbon radical represented by $R^1$ preferably contains from 4 to 20 carbon atoms. Other than the presence of at least one ethylenically unsaturated group capable of participating in the curing reaction of the polyolefin (ingredient A) the structure of $R^1$ is not limited. This radical can include linear, branched and/or cyclic hydrocarbon structures. $R^1$ most preferably contains from 5 to 10 carbon atoms, and is bonded to from 1 to 3 hydroxyl groups.

When compound B2 is a mono- or polyhydric alcohol, preferred embodiments include 1-undecylenyl alcohol, 4-pentene-1-ol and dihydrocarveol.

When compound B2 contains silanol (SiOH) groups or hydrolyzable silanol precursors such as alkoxy groups, these groups can be present in a silane corresponding to the general formula $R^2_n R^3_p SiY_{(4-n-p)}$ or as part of a siloxane containing at least one siloxane unit with an SiOH group and at least one siloxane unit containing either a silicon-bonded alkenyl radical or a hydrocarbon radical containing an ethylenically unsaturated group such as acryloxy as a substituent. A silicon-bonded alkoxy group or other hydrolyzable group can be present in place of the silicon-bonded hydroxyl group.

In the foregoing formulae for the silane embodiment of compound B2, $R^2$ represents a monovalent ethylenically unsaturated radical; $R^3$ represents a monovalent hydrocarbon radical free of ethylenic unsaturation, n is from 1 to 3, inclusive, p is 0, 1, or 2 and Y is silanol or a hydrolyzable silanol precursor; with the proviso that the sum of n+p does not exceed 3.

The monovalent ethylenically unsaturated radical represented by $R^2$ can be an alkenyl radical such as allyl, vinyl or the isomeric butenyl radicals. Alternatively, $R^2$ can contain additional functional groups such as carboxyl and carboalkoxy. Embodiments of $R^2$ containing ethylenically unsaturated functional groups include but are not limited to 3-methacryloxypropyl and 3-acryloxypropyl. $R^2$ can contain from 2 to 20 or more carbon atoms.

The monovalent hydrocarbon radical represented by $R^3$ can contain from 1 to 20 or more carbon atoms and is free of substituents capable of participating in the reaction responsible for curing of the polyolefin. $R^3$ can be a linear or branched alkyl radical such as methyl, ethyl and isopropyl; a cycloalkyl radical such as cyclohexyl; or an aromatic radical such as phenyl, tolyl or benzyl. $R^3$ can contain substituents such as halogen atoms so long as these substituents do not participate in or interfere with curing of the polyolefin composition containing the present adhesion promoting additives.

When compound B2 is an organosiloxane examples of preferred embodiments include liquid silanol-terminated organosiloxane homopolymers and copolymers containing at least one $R^2R^3SiO$ unit. Most preferably $R^2$ is vinyl and $R^3$ is methyl or ethyl. The term "liquid" implies that the compounds flow at 25° C. Optional Ingredients of the Adhesion Promoting Additive In addition to compounds B1 and B2, the adhesion promoting additive referred to as ingredient B can include a catalytically effective amount of a catalyst for the reaction of the epoxide groups present in compound B1 with the hydroxyl or silanol groups present in compound B2. Suitable catalysts include but are not limited to chelated compounds of aluminum such as aluminum acetylacetonate and zinc compounds such as zinc acetylacetonate.

To improve the performance of the present adhesion promoting additives when cured coatings containing these additives are exposed to humid conditions, these additives can optionally include from 10 to 90 weight percent, preferably from 50 to 90 weight percent, based on the total weight of this additive, of at least one silane containing at least one silicon-bonded alkoxy or isoalkenyloxy group.

The optional silane, referred to hereinafter as compound B3, can be represented by the general formula $R^4_tSiX_{(4-t)}$, where $R^4$ represents a monovalent hydrocarbon radical, X represents an alkoxy or isoalkenyloxy group and t is 0 or an integer from 1 to 3, inclusive.

The hydrocarbon radical represented by $R^4$ can contain from 1 to 10 or more carbon atoms and can be saturated or ethylenically unsaturated.

$R^4$ is preferably an alkyl radical containing from 1 to 4 carbon atoms or an alkenyl radical containing from 2 to 15 carbon atoms and X is preferably an alkoxy radical containing from 1 to 4 carbon atoms.

Preferred silanes for optional compound B3 include but are not limited to tetramethoxysilane, tetraethoxysilane, methyltrimethoxysilane, methyltriethoxysilane and hexenyltrimethoxysilane.

When the adhesion promoting additive contains organosilicon compounds with silicon-bonded alkoxy or other groups that react to form siloxane bonds in the presence of moisture, the additive preferably includes a catalyst for this reaction. Suitable catalysts include but are not limited to organotitanium compounds such as tetrabutyl titanate.

The concentration of the present adhesion promoting additive, comprising the combination of compounds B1 and B2 together with the aforementioned optional compound B3 and catalysts, is sufficient to provide cohesive bonding of the cured polyolefin composition to the desired substrate. This typically requires at least about 1 weight percent by weight of the adhesion promoting additive, based on the weight of the curable composition. A concentration of between 1.5 and 7.5 weight percent is preferred.

The ability of the polyolefin composition to cure completely under the desired conditions and/or the properties of the cured composition can be adversely affected when the total concentration of adhesion promoting additives exceeds about 10 weight percent, based on the total weight of the curable composition.

For purposes of the present invention, acceptable cohesive bonding is characterized by cohesive failure, which occurs when the strength of the bond between the cured polyolefin and the substrate exceeds the tensile strength of the cured material.

During a typical adhesion determination, the substrate is immobilized while increasing force is applied along the interface between the substrate and the layer of cured material until at least a portion of the cured material separates from the substrate. Separation along the interface between the cured material and substrate is defined as adhesive failure. A separation within the layer of cured material is referred to as cohesive failure.

The ingredients of preferred curable polyolefin compositions suitable for use with the present adhesion promoting additives will now be discussed in detail.
The Polyolefin The polyolefin, referred to hereinafter as ingredient A of the present curable compositions is the principal ingredient of these compositions. The polyolefin composition can cure to form a crosslinked product by a variety of reactions described hereinbefore involving the ethylenically unsaturated groups on this polymer.

A preferred reaction for curing the polyolefin is hydrosilation, the reaction between ethylenically unsaturated groups and silicon-bonded hydrogen atoms. This reaction requires the presence of a catalyst, which is a platinum group metal or a compound thereof. Polyolefins curable by a hydrosilation reaction preferably contain at least two alkenyl or other ethylenically unsaturated radicals in each molecule. Suitable alkenyl radicals contain from 2 to about 10 carbon atoms and are exemplified by but not limited to vinyl, allyl and 5-hexenyl.

The molecular structure and molecular weight of the polyolefin are not critical to the present invention, and will be determined by the physical properties desired in the cured composition. To achieve a useful level of tensile properties in the elastomers and other products prepared by curing the present compositions, the molecular weight of this ingredient should be sufficient to achieve a viscosity at 25° C. greater than about 0.1 Pa.s.

The upper limit for the molecular weight of the polyolefin is not specifically restricted, and is typically limited only by the processability of the curable composition. The viscosity of the polyolefin can range from a pourable liquid to a gum type polymer that is typically characterized by Williams plasticity values.

The selection of monomer(s) used to prepare the polyolefin is not critical. One or more ethylenically unsaturated hydrocarbons containing from 2 to about 10 carbon atoms can be used to prepare the polyolefin. Suitable hydrocarbons include but are not limited to ethylene, propylene, the isomeric butylenes, dienes such as butadiene and ethylenically unsaturated aromatic hydrocarbons such as styrene.

Preferred embodiments of ingredient A are isobutylene homopolymers and copolymers of isobutylene represented by the following general formulae I, II and III.

R"[C(CH₃)₂CH₂]ₓ[R(R')]ᵧR"  I.

R'[C(CH₃)₂CH₂]ₓ[R'"]ᵧR'  II.

CH₂=CHCH₂[C(CH₃)₂CH₂]ₙC(CH₃)₂-Ph-C(CH₃)₂[CH₂C(CH₃)₂]ₙCH₂CH=CH₂  III.

In these formulae R represents a trivalent hydrocarbon radical, R' and R" are monovalent hydrocarbon radicals containing the —CH=CH₂ group; R'" represents a divalent olefinically unsaturated hydrocarbon radical and Ph represents a phenyl radical. The degree of polymerization represented by n and the sum of x and y is equivalent to a viscosity of at least 100 centipoise (0.1 Pa.s), preferably from 0.1 to 1000 Pa.s.

The Preferred Curing Agent

Preferred curable polyolefin compositions of this invention contain at least one organosilicon compound with at least two silicon-bonded hydrogen atoms that functions as a curing agent for the polyolefin, referred to as ingredient A. In the presence of the hydrosilation catalyst the silicon-bonded hydrogen atoms in the curing agent undergo an addition reaction, referred to as hydrosilation, with the alkenyl groups in the polyolefin, resulting in crosslinking and curing of the composition.

Specific classes of preferred curing agents include but are not limited to silanes containing at least two silicon-bonded hydrogen atoms per molecule and organosiloxanes containing from 2 to about 30 siloxane units and at least two silicon-bonded hydrogen atoms.

When the curing agent is an organohydrogensiloxane it can contain groups other than silicon-bonded hydrogen atoms, so long as these additional groups do not interfere with curing of the polyolefin.

If the polyolefin contains only two alkenyl radicals per molecule, the curing agent must contain an average of more than two silicon-bonded hydrogen atoms to achieve a crosslinked structure in the final cured product.

The organic groups in the organohydrogensiloxane are preferably substantially free of ethylenic or acetylenic unsaturation. The molecular structure of the organohydrogensiloxane can be straight chain, branch-containing straight chain, cyclic, or network.

While the molecular weight of the preferred organohydrogensiloxane is not specifically restricted, viscosities in the range of 3 to 10,000 centipoise (0.003 to 10 Pa.s) at 25 degrees Centigrade are preferred.

The concentration of organohydrogensiloxane is sufficient to provide a molar ratio of silicon-bonded hydrogen atoms to alkenyl radicals in the curable composition of from 0.4 to 20. A range of from 0.4 to 4 is preferred.

When the curable composition contains less than 0.4 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

The Hydrosilation Reaction Catalyst

The reaction between silicon-bonded hydrogen atoms and ethylenically unsaturated groups is catalyzed by metals from the platinum group of the periodic table and compounds of these metals. These catalysts are present in compositions cured using this type of reaction. Platinum group metals include platinum, palladium and rhodium. Platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of hydrosilation catalyst in the present compositions is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

The Hydrosilation Catalyst Inhibitor

Mixtures of the aforementioned ingredients A, B and the hydrosilation catalyst may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalyst inhibitors typically require heating at temperatures of 70° C. or above to cure at a practical rate.

When it is desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The type and concentration of inhibitor that will provide excellent adhesion in a given composition can readily be determined by routine experimentation and does not constitute part of this invention. It has been noted by the present inventors that certain types of catalyst inhibitors may adversely affect the degree of adhesion that is developed under a given set of curing conditions relative to compositions containing a different type of catalyst inhibitor.

Optional Ingredients

The present polyolefin compositions can contain one or more additives that are conventionally present in curable compositions of this type to impart or enhance desired physical properties other than adhesion to the cured composition or to facilitate processing of the curable composition.

Typical additives include but are not limited to processing aids, reinforcing fillers such as finely divided silica; non-reinforcing fillers such as quartz, alumina, mica and calcium carbonate; pigments such as carbon black and titanium dioxide; dyes, flame retardants, and heat and/or ultraviolet light stabilizers.

The Preparation of Curable Compositions

The compositions of this invention can be prepared by combining all desired ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers and two- and three-roll rubber mills.

Cooling of the ingredients during mixing may be desirable to avoid premature curing of the composition.

To maximize storage stability of polyolefin compositions that cure by a hydrosilation reaction, the curable compositions are preferably kept in closed containers until used. If greater storage stability is desired, the ingredients of the compositions can be packaged in two or more containers with the organohydrogensiloxane curing agent and the platinum group metal catalyst in separate containers.

Cured polyolefin materials prepared using the present compositions can vary in properties from brittle resins to elastomers to gels, and are useful in a variety of end-use applications such as coatings or as molded or extruded articles.

Unfilled materials are particularly useful as gels and coatings for protecting delicate electronic devices such as integrated circuits from damage by moisture and other materials present in the environment that can adversely affect operation of the device. The compositions can be used to coat either the individual devices or a circuit board containing a number of these devices together with other electronic components.

Compositions containing reinforcing and/or non-reinforcing fillers are useful as adhesives, encapsulants and potting materials.

The present compositions can be applied to substrates by spraying, dipping, pouring, extrusion or by the use of a brush, roller or coating bar. The selection of a particular application method will be determined at least in part by the viscosity of the curable composition. The viscosity of the composition can be reduced using suitable solvents as known in the art.

EXAMPLES

The following examples describe preferred curable compositions of the present invention and should not be interpreted as limiting the scope of the invention defined in the accompanying claims. Unless otherwise specified all parts and percentages in the example are by weight and viscosities were measured at 25° C.

Example 1

This example demonstrates the excellent adhesion of a cured polyisobutylene composition to a variety of substrates that can be achieved using a preferred adhesion-promoting additive of the present invention.

Curable polyisobutylene compositions were prepared by blending the following ingredients to homogeneity:

92.96 parts of a filled polymer composition containing the following ingredients:

100 parts of a telechelic allyl-terminated polyiso-butylene exhibiting a molecular weight of 10,000 and containing 0.513 weight percent of allyl radicals;

100 parts of a liquid hydrogenated polybutene exhibiting an average molecular weight of 363 and available as Pannalane(R) L-14-E from Amoco Corporation;

100 parts of a precipitated calcium carbonate exhibiting an average particle size of 0.075 micron a surface area of 21 m$^2$ per gram and a stearate ester coating, and 50 parts of a ground calcium carbonate available from Georgia Marble as CS-11.

As the curing agent for the polymer, 1.74 parts of a copolymer exhibiting the average molecular formula $Me_3SiO(Me_2SiO)_3(MeHSiO)_5SiMe_3$.

As the curing catalyst, 5.2 parts of a mixture containing 0.4 parts of a complex of platinic chloride with sym-tetramethyldivinyldisiloxane and 99.6 parts of the liquid hydrogenated polybutene referred to hereinbefore as Pannalane(R)L-14-E. The complex contained 21 weight percent platinum.

As the curing catalyst inhibitor 0.138 parts of cyclic methylvinylsiloxanes.

0.5 part of 3-glycidoxoypropyltrimethoxysilane as compound B1 of the present adhesion promoting additives.

0.5 part of a hydroxyl-terminated siloxane oligomer containing an average of 4 dimethylsiloxane and 1 methylvinylsiloxane unit per molecule as compound B2 of the present adhesion promoting additive.

As optional adhesion promoters referred to hereinbefore as compound B3, 0.25 parts of hexenyltrimethoxysilane and 3.5 parts of tetraethyl ortho-silicate.

As the catalyst for reaction of the epoxy groups present in the adhesion promoting additive, 0.25 part of a 4 weight percent solution of aluminum acetylacetonate in toluene.

As the catalyst for hydrolysis of the silicon-bonded alkoxy groups in the composition, 0.1 part of tetrabutyl titanate.

Portions of each of the curable compositions evaluated were applied as 10 mil (0.25 mm)-thick liquid films to the desired substrate using a draw-down bar.

The liquid coatings on one group of substrates were cured under ambient conditions for 24 hours, 3 days or 7 days prior to being evaluated.

The coatings on a second group of substrates were cured by heating at 70° C. for 30 minutes. A third group of coatings were cured at 120° C. for 90 minutes. The adhesion of one group of cured coatings was evaluated immediately following cooling. Additional groups of coated substrates were evaluated for adhesion after the substrates had remained under ambient conditions for 24 hours, 3 days, and 7 days following heating. The coatings cured at 70° C. were also evaluated following storage for 14 days under ambient conditions.

Another set of liquid coatings were cured at 70° C. for 30 minutes following which the coated substrates were immersed in water for 24 hours, 3 days, 7 days or 14 days prior to being evaluated.

The substrates evaluated were glass and stainless steel (SS).

The adhesion test consisted of attempting to separate the cured coating from the substrate by inserting the blade of a metal spatula at the interface between the coating and the substrate and determining whether any of the coating could be separated from the substrate without leaving a liquid or solid residue from the coating on the surface of the substrate. The adhesion was rated 0 if the coating could be removed completely without leaving any solid residue.

If some solid residue remained, the residue was rubbed using a fingertip to determine the pressure required to remove it, and the adhesion was rated according to the following scale.

1=light pressure required
2=moderate pressure required
3=heavy pressure required
4=no coating could be removed under any pressure The results of the evaluation are summarized in the following tables.

Room Temperature Cure

| | Adhesion Ratings | | |
|---|---|---|---|
| Substrate | 24 Hours | 3 Days | 7 Days |
| Glass | 0 | 4 | 2 |
| SS | 4 | 4 | 4 |

70° C. Cure For 30 Minutes

| | Adhesion Ratings | | | | |
|---|---|---|---|---|---|
| Substrate | Immediate | 24 Hours | 3 Days | 7 Days | 14 Days |
| Glass | 4 | 4 | 4 | 4 | 4 |
| SS | 4 | 4 | 4 | 4 | 4 |

70° C. Cure For 30 Minutes Followed by 60° C. Water Immersion

| | Adhesion Ratings Following X Hours Immersion | | | |
|---|---|---|---|---|
| Substrate | X = 24 Hrs. | X = 3 Days | X = 7 Days | X = 14 Days |
| Glass | 4 | 4 | 4 | 4 |
| SS | 4 | 4 | 4 | 4 |

All of the coatings that were cured at 70° C. exhibited cohesive failure (a rating of 4) that was not adversely affected by immersion in water.

When cured at room temperature cohesive failure was developed to steel after 24 hours and to glass after 3 days.

Example 2

This example demonstrates the improvement in adhesion achieved using the two ingredients of the present adhesion promoting additives relative to using either ingredient individually.

Curable polyisobutylene compositions were prepared by blending the following ingredients to homogeneity:

100 parts of the isobutylene polymer described in Example 1;

A copolymer exhibiting the average molecular formula $Me_3SiO(Me_2SiO)_3(MeHSiO)_5SiMe_3$ in the amounts specified in Table 3 in the column headed "SiH";

100 parts of parts of a liquid polyisobutylene exhibiting a number average molecular weight of 363;

100 parts of a calcium carbonate available as SPM Winnofil;

50 parts of a ground calcium carbonate available from Georgia Marble as

CS-11;

0.14 part of cyclic methylvinylsiloxanes as a curing catalyst inhibitor;

0.1 part of tetrabutyl titanate;

0 or 0.25 part of aluminum acetylacetonate (Al(acac)), a known catalyst for the reaction of epoxide compounds, as a 4% by weight solution in toluene; and 30 ppm of platinum in the form of a complex of platinic chloride and sym-dimethyldivinyl-disiloxane.

The following five adhesion additives of the present invention were evaluated:

As a compound B1; 3-glycidoxypropyltrimethoxy-silane (ingredient 1);

As a compound B2; a hydroxyl-terminated siloxane oligomer containing an average of 4 dimethyl-siloxane and 1 methylvinylsiloxane unit per molecule (ingredient 2);

As a compound B2, 1-undecylenyl alcohol (ingredient 3);

As a compound B2, the diallyl ether of trimethylolpropane (ingredient 4);

As an optional silane (compound B3), tetraethyl orthosilicate (ingredient 5)

The number and amount of ingredients present in the compositions evaluated are summarized in the following Table 3. Compositions 1 and 2 are outside the scope of the present invention and were evaluated for comparative purposes.

TABLE 3

| | Composition Ingredients (parts by weight) | | | | | | |
|---|---|---|---|---|---|---|---|
| No. | 1 | 2 | 3 | 4 | 5 | Al(AcAc) | SiH |
| 1 (C) | — | — | — | — | 4.5 | 0 | 1.444 |
| 2 (C) | 4.5 | — | — | — | — | 0 | 1.44 |
| 3 | 0.5 | 0.5 | — | — | 3.5 | 0.25 | 1.709 |
| 4 | 0.5 | 0.5 | — | — | 3.5 | 0 | 1.704 |
| 5 | 0.5 | 0.1 | — | — | 3.5 | 0 | 1.49 |
| 6 | 0.5 | — | 0.1 | — | 3.5 | — | 1.516 |
| 7 | 0.5 | — | — | 1.5 | 3.5 | 0 | 1.835 |
| 8 | 0.5 | 0.1 | — | — | 3.5 | 0.25 | 1.541 |
| 9 | 0.5 | — | 0.1 | — | 3.5 | 0.25 | 1.567 |

C = Comparative Composition

The curable compositions were evaluated by applying them as liquid films to substrates using the procedure described in the preceding Example 1 and then curing the films. The substrates evaluated were glass, bare aluminum (bare Al), milled aluminum (milled Al) and stainless steel (SS).

The liquid films were cured using the following temperature schedules:

Under ambient conditions for 24 hours, 3 days and 7 days.

At 70° C. for 30 minutes followed by an adhesion evaluation upon cooling and after remaining under ambient conditions for 24 hours 3 days and 7 days.

At 120° C. for 90 minutes followed by an adhesion evaluation upon cooling and after remaining under ambient conditions for 24 hours, 3 days and 7 days.

The results of the evaluations are summarized in Table 4. A rating of "NC" indicates that the composition did not cure under the specified conditions. The notation "NE" indicates that ambient temperature curing was not used.

TABLE 4

| Sample | Room Temp. | | | 70° C. | | | | 120° C. | | | |
|---|---|---|---|---|---|---|---|---|---|---|---|
| | 24 Hr. | 3d | 7d | Im. | 24 Hr | 3d | 7d | Im | 24 Hr | 3d | 7d |
| No. 1(C) | | | | | | | | | | | |
| Glass | NC | 4 | 2 | 1 | 4 | 4 | 4 | 4 | 4 | 4 | 4 |
| Bare Al | NC | 4 | 4 | 0 | 1 | 1 | 0 | 4 | 4 | 4 | 4 |
| Milled Al | NC | 4 | 4 | 1 | 1 | 4 | 4 | 4 | 4 | 4 | 4 |
| SS | NC | 4 | 4 | 0 | 2 | 1 | 2 | 0 | 2 | 1 | 2 |
| No. 2(C) | | | | | | | | | | | |
| Glass | 0 | 0 | 0 | 1 | 1 | 1 | 1 | 4 | 4 | 4 | 4 |
| Bare Al | 0 | 0 | 0 | 0 | 0 | 0 | 0 | 1 | $0/4^1$ | $0/4^1$ | $0/4^1$ |
| Milled Al | 4 | 4 | 4 | 1 | 1 | 4 | 4 | 4 | 4 | 4 | 4 |
| SS | 4 | 4 | 4 | 1 | 4 | 4 | 4 | 4 | 4 | 4 | 4 |
| No. 3 | | | | | | | | | | | |
| Glass | NC | $0/4^1$ | $0/4^1$ | 4 | 4 | 4 | 4 | 4 | 4 | 4 | 4 |
| Bare Al | NC | $0/4^1$ | $0/4^1$ | 4 | 4 | 4 | 4 | 4 | 4 | 4 | 4 |
| Milled Al | NC | $0/4^1$ | $0/4^1$ | 4 | 4 | 4 | 4 | 4 | 4 | 4 | 4 |
| SS | NC | $0/4^1$ | $0/4^1$ | 4 | 4 | 4 | 4 | 4 | 4 | 4 | 4 |
| No. 4 | | | | | | | | | | | |
| Glass | NC | PC | $0/4^1$ | $0/4^1$ | $0/4^1$ | $0/4^1$ | 2 | 4 | 4 | 4 | 4 |
| Bare Al | NC | PC | $0/4^1$ | 4 | 4 | 4 | 4 | 4 | 4 | 4 | 4 |
| Milled Al | NC | PC | $0/4^1$ | 4 | 4 | 4 | 4 | 4 | 4 | 4 | 4 |
| SS | NC | PC | $0/4^1$ | 4 | 4 | 4 | 4 | 4 | 4 | 4 | 4 |
| No. 5 | | | | | | | | | | | |
| Glass | 0 | 0 | $0/4^1$ | 4 | 4 | 4 | 4 | 4 | 4 | 4 | 4 |
| Bare Al | 0 | 4 | 4 | 1 | 4 | 4 | 4 | 0 | $0/4^1$ | $0/4^1$ | 4 |
| Milled Al | 4 | 4 | 4 | 4 | 4 | 4 | 4 | 4 | 4 | 4 | 4 |
| SS | 4 | 4 | 4 | 4 | 4 | 4 | 4 | 4 | 4 | 4 | 4 |
| No. 6 | | | | | | | | | | | |
| Glass | 1 | 1 | $0/4^1$ | 4 | 4 | 4 | 4 | 4 | 4 | 4 | 4 |
| Bare Al | 4 | 4 | 4 | 1 | 1 | 3 | 4 | 4 | 4 | 4 | 4 |
| Milled Al | 4 | 4 | 4 | 4 | 4 | 4 | 4 | 4 | 4 | 4 | 4 |
| SS | 4 | 4 | 4 | 4 | 4 | 4 | 4 | 4 | 4 | 4 | 4 |
| No. 7 | | | | | | | | | | | |
| Glass | 4 | 4 | 1 | 2 | 1 | 1 | 1 | 4 | 4 | 4 | 4 |
| Bare Al | 4 | 4 | 4 | 1 | 1 | 1 | 1 | 4 | 4 | 4 | 4 |
| Milled Al | 4 | 4 | 4 | 4 | 4 | 4 | 4 | 4 | 4 | 4 | 4 |
| SS | 4 | 4 | 4 | 4 | 4 | 4 | 4 | 4 | 4 | 4 | 4 |
| No. 8 | | | | | | | | | | | |
| Glass | NE | NE | NE | 4 | 4 | 4 | 4 | 4 | 4 | 4 | 4 |
| Bare Al | NE | NE | NE | 0 | 1 | 1 | 1 | 4 | 4 | 4 | 4 |
| Milled Al | NE | NE | NE | 3 | 4 | 4 | 4 | 4 | 4 | 4 | 4 |
| SS | NE | NE | NE | 1 | 4 | 4 | 4 | 4 | 4 | 4 | 4 |
| No. 9 | | | | | | | | | | | |
| Glass | NE | NE | NE | 4 | 4 | 4 | 4 | 4 | 4 | 4 | 4 |
| Bare Al | NE | NE | NE | 0 | 1 | 1 | 4 | 4 | 4 | 4 | 4 |
| Milled Al | NE | NE | NE | 1 | 4 | 4 | 4 | 4 | 4 | 4 | 4 |
| SS | NE | NE | NE | 4 | 4 | 4 | 4 | 4 | 4 | 4 | 4 |

NC = coating not cured
NE = curing condition not evaluated
$^1$ = Rating of 0/4 indicates that degree of curing varied over surface of substrate. Cured portions exhibited cohesive failure, partially cured portions did not.

For the coatings cured at room temperature, after 24 hours the composition containing prior art adhesion promoter 3-glycidoxypropyltrimethoxysilane adhered to milled aluminum and steel. Under the same curing conditions compositions 6 and 7 of the present invention adhered to these substrates in addition to unfinished aluminum.

After 3 days at room temperature, prior art composition 1 and composition 7 of the present invention adhered to all substrates. Compositions 5 and 6 adhered to both types of aluminum and steel.

After 7 days prior art composition 1 and compositions 5, 6 and 7 of the present invention adhered to both types of aluminum and steel.

Curing at 70 degrees substantially improved the performance of compositions 3–6 relative to curing under ambient conditions, but had an adverse effect on prior art composition 1 and resulted in only a minor improvement or a decrease in the adhesion of prior art composition 2. The adhesion of composition 7 of the present invention to glass and bare aluminum was adversely affected by the increase in curing temperature. Storage under ambient conditions resulted in cohesive failure of compositions 8 and 9 to three of the four substrates.

Almost all of the compositions tested exhibited cohesive failure when cured at 120° C. for 90 minutes.

Summarizing, the adhesion-promoting compositions of the present invention developed excellent adhesion, evidenced by cohesive failure, under milder curing conditions than the single-ingredient adhesion promoters of the prior art containing the same type of reactive groups as the present compositions.

That which is claimed is:

1. A self-adhering polyolefin composition comprising
   A. a polyolefin wherein each molecule contains at least two ethylenically unsaturated substituents capable of reacting to cure said polyolefin; and
   B. an effective amount of an adhesion promoter for said polyolefin;
   wherein the adhesion promoter comprises
   (B1) at least one compound containing at least one epoxide group, wherein said compound B1 is selected from the group consisting of organic compounds and organosilicon compounds; and
   (B2) at least one compound containing a) at least one substituent selected from the group consisting of silanol (≡SiOH), hydrolyzable silanol precursors and carbinol (≡COH) and (b) at least one substituent capable of reacting during curing of said polyolefin;
   and wherein all compounds corresponding to compound B1 constitute from 10 to 90 percent of the combined weight of all compounds corresponding to compounds B1 and B2.

2. A composition according to claim 1 wherein compound B1 is selected from the group consisting of aliphatic epoxides; cycloaliphatic epoxides; the mono- and diglycidyl ethers of mono-and polyhydric alcohols, the glycidyl ethers of phenols, the mono- and diglycidyl ethers of bis-phenols, silanes containing at least one epoxy group per molecule and organopolysiloxanes containing at least one epoxy group per molecule; compound B2 is selected from the group consisting of (a) mono-hydric hydrocarbon alcohols, (b) polyhydric hydrocarbon alcohols, wherein the hydrocarbon portion of said alcohols is ethylenically unsaturated, and (c) silanes and (d) organopolysiloxanes, wherein said silanes and organopolysiloxanes contain (i) at least one substituent selected from the group consisting of silanol (SiOH) and hydrolyzable silanol precursors and (ii) at least one ethylenically unsaturated group per molecule, and wherein the weight of all compounds corresponding to compound B1 constitute from 33 to 80 percent of the combined weight of all compounds corresponding to compounds B1 and B2.

3. A composition according to claim 2 wherein compound B1 is an organosilicon compound containing at least one epoxy group per molecule.

4. A composition according to claim 1 wherein compound B2 is an alcohol represented by the formula $R^1(OH)_m$ wherein $R^1$ represents an ethylenically unsaturated hydrocarbon radical exhibiting a valence of m and containing at least 3 carbon atoms and m is an integer with a value of at least 1.

5. A composition according to claim 4 where the hydrocarbon radical represented by $R^1$ contains from 4 to 20 carbon atoms.

6. A composition according to claim 5 where $R^1$ contains from 5 to 12 carbon atoms, and is bonded to from 1 to 3 hydroxyl groups.

7. A composition according to claim 6 wherein compound B2 is at least one member selected from the group consisting of the isomeric undecylenic alcohols, 4-pentene-1-ol, and dihydrocarveol.

8. A composition according to claim 2 wherein compound B2 is selected from the group consisting of silanes exhibiting the general formula $R^2_n R^3_p SiY_{(4-n-p)}$ and organopolysiloxanes containing in each molecule at least one substituent represented by Y and at least one siloxane unit wherein the silicon atom is bonded to an alkenyl radical or a hydrocarbon radical containing an ethylenically unsaturated substituent, wherein $R^2$ represents an monovalent ethylenically unsaturated radical; $R^3$ represents a monovalent hydrocarbon radical free of ethylenic unsaturation, n is from 1 to 3 inclusive, p is 0, 1, or 2; and Y represents silanol or a hydrolyzable silanol precursor, with the proviso that the sum of n+p does not exceed 3.

9. A composition according to claim 8 where $R^2$ is selected from the group consisting of alkenyl radicals and hydrocarbon radicals containing ethylenically unsaturated substituents; and $R^3$ is selected from the group consisting of methyl, ethyl, cyclohexyl, phenyl, tolyl and benzyl.

10. A composition according to claim 9 where $R^2$ is selected from vinyl or allyl, $R^3$ is selected from methyl or ethyl and Y is a hydrolyzable silanol precursor.

11. A composition according to claim 10 wherein Y is an alkoxy group containing from 1 to 4 carbon atoms.

12. A composition according to claim 1 where said adhesion promoter additionally comprises at least one of a compound B3 selected from the group consisting of silanes containing at least one silicon-bonded substituent selected from alkoxy or isoalkenyloxy and the combined weight of all compounds corresponding to compound B3 constitutes from 10 to 90 percent of the total weight of said additive.

13. A composition according to claim 12 wherein said compound B3 is represented by the general formula $R^4_t SiX_{(4-t)}$, wherein $R^4$ is selected from the group consisting of monovalent saturated and ethylenically unsaturated hydrocarbon radicals X represents an alkoxy or isoalkenyloxy group and t is 0 or an integer from 1 to 3, inclusive.

14. A composition according to claim 13 wherein $R^4$ is an alkyl radical containing from 1 to 4 carbon atoms or an alkenyl radical containing from 2 to 15 carbon atoms and X is an alkoxy radical containing from 1 to 4 carbon atoms.

15. A composition according to claim 14 wherein said compound B3 is at least one member selected from the group consisting of tetramethyl orthosilicate, tetraethyl orthosilicate, methyltrimethoxysilane, methyltriethoxysilane and hexenyltrimethoxysilane and the compounds corresponding to compound B3 constitute from 50 to 90 weight percent of said adhesion promoter.

16. A composition according to claim 2 wherein compound B1 is glycidoxypropyltrimethoxysilane; compound B2 is a hydroxyl-terminated organosiloxane oligomer wherein the repeating units are dimethylsiloxane and methylvinylsiloxane; and compound B3 is at least one member of the group consisting of hexenyltrimethoxysilane and tetraethyl orthosilicate.

17. A composition according to claim 1 wherein the concentration of said adhesion promoter is from 1.5 to 7.5 weight percent, based on the total weight of said composition.

18. A composition according to claim 1 wherein said polyolefin is selected from the group consisting of polymers and copolymers of olefins containing from 2 to 10 carbon atoms.

19. A composition according to claim 18 wherein said polyolefin is selected from the group consisting of homopolymers and copolymers of isobutylene and is flowable at 25° C.

20. A composition according to claim 1 wherein said composition further comprises a curing agent for said polyolfin.

21. A composition according to claim 20 wherein said curing agent is an organohydrogensiloxane and said composition further comprises a catalytically effective amount of a curing catalyst selected from the group consisting of metals from the platinum group of the periodic table and compounds of said metals.

* * * * *